United States Patent
Deguchi et al.

(10) Patent No.: US 6,980,745 B2
(45) Date of Patent: Dec. 27, 2005

(54) OPTICAL TRANSMISSION SYSTEM

(75) Inventors: Hiroyuki Deguchi, Kawasaki (JP); Shin-ichirou Harasawa, Kawasaki (JP); Izumi Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 10/014,442

(22) Filed: Dec. 14, 2001

(65) Prior Publication Data
US 2003/0035184 A1 Feb. 20, 2003

(30) Foreign Application Priority Data
Aug. 14, 2001 (JP) .............................. 2001-246063

(51) Int. Cl.[7] .............................................. H04B 10/16
(52) U.S. Cl. ...................... 398/177; 398/173; 398/175; 398/181; 359/334; 359/341.3
(58) Field of Search .................... 398/181, 33, 77, 398/32, 177, 173, 175, 27, 157; 359/334, 359/341.3

(56) References Cited

U.S. PATENT DOCUMENTS

| | | |
|---|---|---|
| 4,401,364 A | 8/1983 | Mochizuki |
| 5,291,326 A | 3/1994 | Heidemann |
| 5,383,046 A | 1/1995 | Tomofuji et al. |
| 5,535,037 A | 7/1996 | Yoneyama |
| 6,414,775 B1 * | 7/2002 | Pedersen .................... 398/177 |

FOREIGN PATENT DOCUMENTS

| | | |
|---|---|---|
| EP | 415438 | 3/1991 |
| EP | 449 475 | 10/1991 |
| EP | 552 937 | 7/1993 |
| JP | 03239028 A | 10/1991 |
| WO | WO/01/48962 | 7/2001 |

OTHER PUBLICATIONS

United Kingdom Search Report Dated Oct. 16, 2002.

* cited by examiner

*Primary Examiner*—David C. Payne
(74) *Attorney, Agent, or Firm*—Staas & Halsey LLP

(57) ABSTRACT

An optical transmission system ensuring high-quality monitor control even if an optical fiber fault occurs. A monitor instruction sending unit sends a monitor instruction. An operating condition recognizing unit receives a response signal and recognizes the operating condition. A filtering unit filters the monitor instruction and the response signal. A monitor control unit monitors the operating condition of its own repeater in response to the monitor instruction, and generates resultant response information. A pump unit generates a pump light to cause Raman amplification within an optical fiber transmission medium. A regeneration control unit performs a regeneration control of the response signal to thereby create a regenerated signal. A modulation control unit modulates the pump light by the response information or the regenerated signal to thereby generate the response signal.

6 Claims, 6 Drawing Sheets

OPTICAL TRANSMISSION SYSTEM

BACKGROUND OF THE INVENTION

1. Field of the Invention

The present invention relates to optical transmission systems, and more particularly, to an optical transmission system that performs optical transmission control.

2. Description of the Related Art

The demand of international telecommunications is rapidly expanded by globalization of business, the spread of the Internet and so on. In that situation, an optical submarine transmission system is important together with satellite communications, and early realization of an economical, large-capacity optical submarine transmission system is strongly desired.

In the optical submarine transmission system, optical fiber cables are laid to the sea floor, and are connected through repeaters so as to obtain an extremely long transmission distance with optical amplifying. Further, the optical submarine transmission system is demanded to have the severest reliability because a fault that occurs underwater needs a huge amount of cost and time to repair the fault. Therefore, it is required to provide the system with a fault detecting function of locating a fault definitely.

In the fault detection control, an end station on the land sends repeaters an optical instruction for monitoring the operating condition thereof. Each repeater receives the instruction and monitors its own operating condition, then sending back a response to the end station. In this manner, the end station and the repeaters communicate with each other to monitor the condition of optical submarine transmission.

The conventional repeaters employ an erbium-doped optical fiber amplifier (abbreviated as EDFA) for optical amplification. The response signal sent by the EDFA repeater includes response information that is modulated onto a main signal that is the output of a pumping laser diode for exciting the EDFA.

Even if a fault such as breakdown occurs in the optical fiber cable to cause the optical main signal to be lost, the EDFA repeater continues to perform the monitor control because the response signal can be sent by modulating an amplified spontaneous emission (ASE) emitted by the EDFA itself, which is an amplifying medium.

Recent optical communication systems employ an optical fiber amplifier (Raman amplification), which utilizes a non-linear optical phenomenon that occurs within the optical fiber, called Raman amplification. This utilizes a physical effect such that light having a different wavelength from that of an incident light is scattered because of a vibration effect within a substance. Amplification is implemented by applying a strong pump light so as to travel down the whole optical fiber transmission medium. The Raman amplification does not limit the amplifiable range.

Application of the Raman amplification to the repeater enables a longer optical fiber to be laid and increases the intervals at which repeaters are arranged.

The response signal that represents the operating condition of the Raman amplification repeater can be sent therefrom in the same manner as that for the EDFA repeater. That is, response information is modulated onto the output of the pump laser diode that excites the optical fiber so that the main signal is modulated.

However, the Raman amplification repeater that does not have EDFA has a problem described below. If a fiber cable fault occurs at a position close to the repeater, the amplifying medium is no longer available. This results in loss of ASE and means for sending the response signal to the end station by modulation of ASE. As a result, the monitor control is lost after the fiber fault occurs.

SUMMARY OF THE INVENTION

Taking the above into consideration, an object of the present invention is to provide an optical transmission system with Raman amplification capable of performing high-quality monitor control even if an optical fiber fault occurs.

To achieve the above object, according to the present invention, there is provided an optical transmission system comprising: an end station including a monitor instruction sending unit for sending a monitor instruction for monitoring an operating condition, and an operating condition recognizing unit for receiving a response signal and recognizing the operating condition; and a repeater. The repeater includes: a filtering unit filtering the monitor instruction and the response signal; a monitor control unit monitoring an operating condition of the repeater in response to the monitor instruction and generating response information that is a result of monitoring; a pump unit applying a pump light to an optical fiber transmission medium and enabling an optical amplification using the optical fiber transmission medium as an amplifying medium; a regeneration control unit performing a regeneration control of the response signal sent by another repeater to thereby generate a regenerated signal; a modulation control unit modulating the pump light by the response information or the regenerated signal to thereby generate the response signal; and a photocoupler unit that is connected to the optical fiber transmission medium and sends the response signal in a direction identical to or reverse to that in which an optical main signal travels.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Now, a description will be given of embodiments of the present invention with reference to the accompanying drawings.

Figure 1:
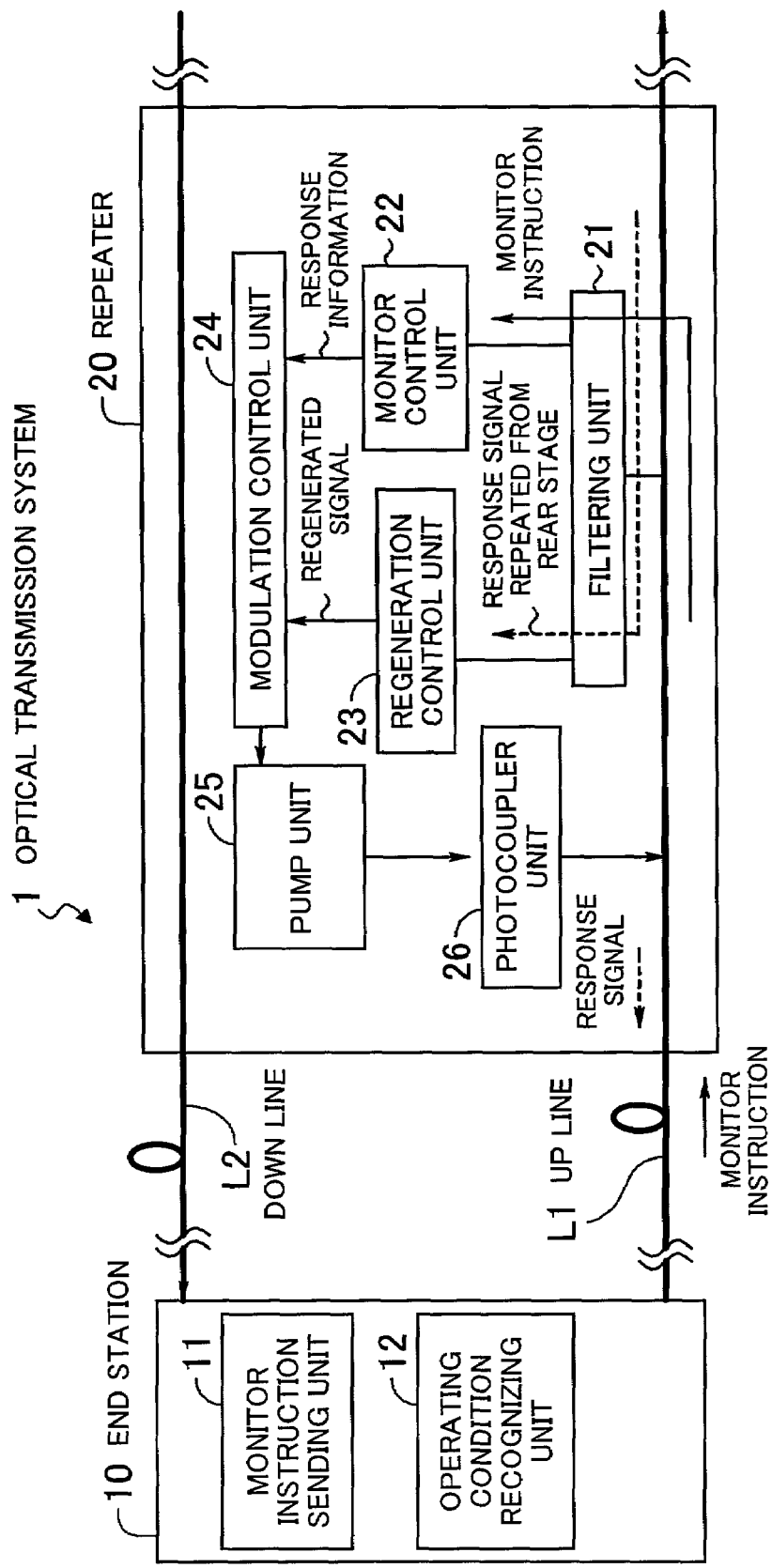
FIG. 1 is a block diagram of the principles of an optical transmission system of the present invention.

FIG. 1 is a diagram of the principles of an optical transmission system of the present invention. An optical transmission system 1 includes a cable-end station 10 and a repeater 20, which are connected through an optical fiber transmission medium including an up line L1 and a down line L2. The system shown in FIG. 1 enables an optical long-distance transmission and has the function of monitoring the operating condition of the repeater 20.

Although not illustrated in FIG. 1, the practical system may include another end station connected to the other end of the optical fiber and multiple repeaters. When the system is applied to optical submarine transmission, the optical transmission media and the multiple repeaters 20 may be installed underwater and the end stations 10 may be installed in land stations.

A monitor instruction sending unit 11 of the end station 10 sends a monitor instruction to the repeater 20 through the up line L1. The monitor instruction is an optical signal for monitoring the operating condition of the repeater 20.

An operating condition recognizing unit 12 receives a response signal that travels from the repeater 20, and recognizes the operating condition of the repeater 20 to be monitored. In FIG. 1, the response signal travels in the up line L1 in the direction reverse to the direction in which the monitor instruction travels.

The repeater 20 has an internal structure that can be controlled in two ways by the end stations respectively coupled to the opposing ends of the transmission media. A filtering unit 21 of the repeater 20 filters the monitor instruction and the response signal. When the optical main signal (monitor instruction) has a wavelength band of 1.55 $\mu$m and the pump light (response signal) has a wavelength band of 1.45 $\mu$m, the filtering unit 21 allows the signals of these bands to be output to a monitor control unit 22 and a regeneration control unit 23, respectively.

The monitor control unit 22 converts the monitor instruction passing through the filter unit 21 into an electric signal. In response to the monitor instruction, the monitor control unit 22 monitors the operating condition of the repeater 20, and generates response information that represents the results of monitoring.

Examples of the operating condition monitored by the repeater 20 are the input/output level of the optical main signal and the driving current applied to the pumping laser diode.

The regeneration control unit 23 regenerates the response signal sent by the repeater of the rear stage. More particularly, the regeneration control unit 23 converts the response signal that is sent by the not-shown repeater and travels in the up line L1 into an electric signal, which is waveform-shaped.

The regeneration control unit 23 ceases the regeneration control and stops sending the regenerated signal when a modulation control unit 24 modulates the pump light by response information. That is, when the regeneration control unit 23 receives the monitor instruction addressed to its own repeater, the regeneration control unit 23 ceases the regeneration control.

This prevents the modulation control at the time of generating the response signal responsive to the monitor instruction and the modulation control due to the repeated response signal from being mixed. Thus, it is possible to prevent occurrence of an unwanted situation in which the response signal repeatedly travels in a loop including the up line L1 and the down line L2 and the system is brought into an oscillating condition.

A pump unit 25 applies a pump light to the optical fiber transmission medium for Raman amplification using the optical fiber transmission medium as an amplifying medium. The modulation control unit 24 modulates the pump light by response information to thus generate the response signal, or modulates the pump light by the regenerated signal to thus generate the response signal again. In the latter case, the response signal is repeated.

A photocoupler unit 26 is connected to the optical fiber transmission medium, and sends the response signal toward the upstream repeater 20 in the direction identical to or reverse to the direction in which the optical main signal is transferred. The detailed structure and operation of the present invention will be described later.

Figure 2:
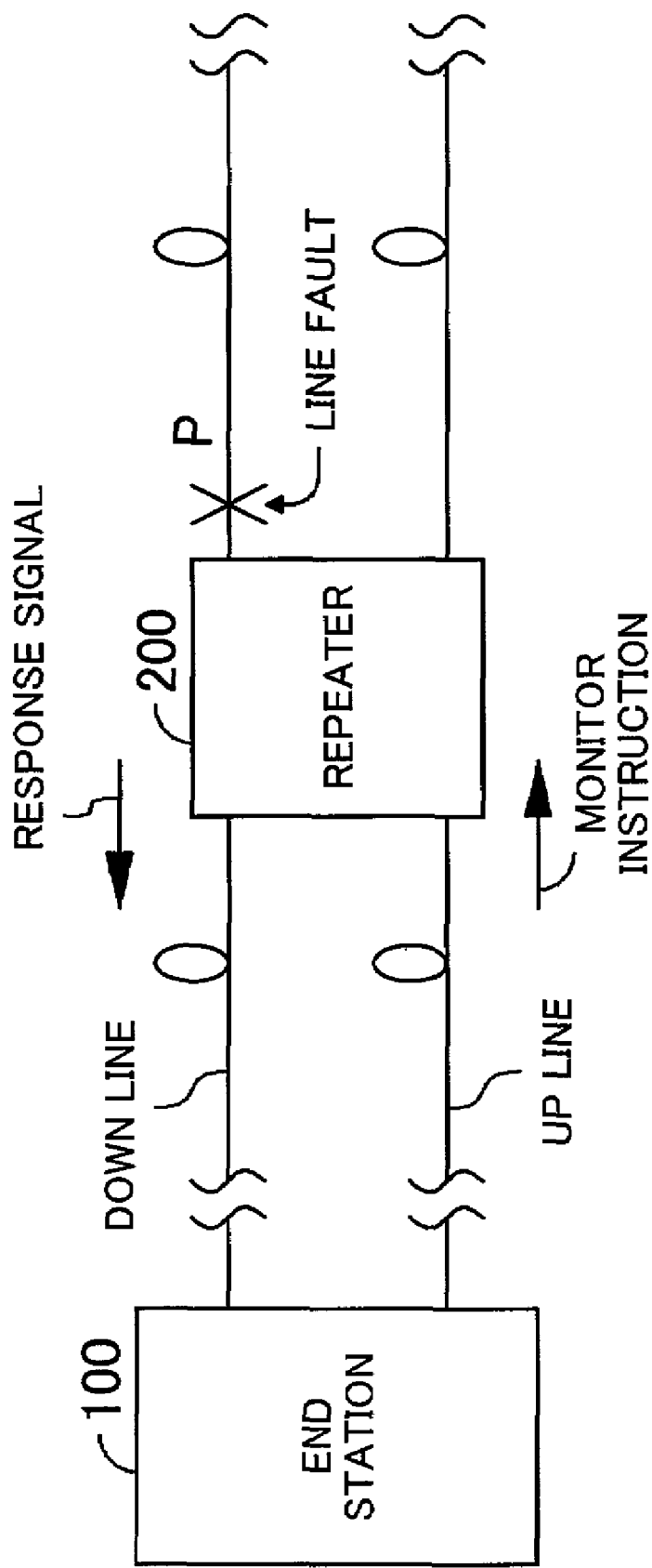
FIG. 2 is a block diagram explaining problems.

Problems to be solved by the present invention are now described. FIG. 2 is a block diagram explaining the problems. An end station or landing station 100 located on the left side of the drawing sends a monitor instruction to a repeater 200 via an up line. The repeater 200, which has a conventional structure, monitors its own operating condition in response to the monitor instruction. The response information is superimposed onto the optical main signal that travels in the down line, and a response signal thus generated is sent back to the end station 100.

It is assumed that a fault occurs at position P on the down optical fiber cable connected to the repeater 200, the position P being very close to the repeater 200. In this case, the repeater 200 does not receive down main signals at all.

However, if the repeater 200 employs EDFA as an amplifying medium, the repeater 200 will automatically controls its output at a constant level. Thus, the gain of the EDFA in the repeater is spontaneously increased if no main signal is received. In this case, ASE inherent in the amplifying medium takes place, so that modulation is now available.

Therefore the EDFA repeater can send back the response signal to the end station 100 for monitor control even if a fault occurs in the optical fiber cable.

A case is now considered where the repeater 200 employs the Raman amplification system. The optical fiber cables outside of the repeater 200 act as amplifying media, which can amplify the signal lights by applying the pump light from the pump source to the cables. Thus, in normal operation, the response signal can be sent back to the end station 100 by modulating the pump power.

However, if a fiber fault occurs at position P very close to the repeater 200, the amplifying medium itself is no longer available. In this situation, ASE does not occur. Neither ASE nor the main signal are lost, so that no carrier for transmission of response information is available. This disables the monitor control. In a particular situation, ASE occurs and the monitor control is available. For example, if the cable fault occurs at a remote position that is tens of kilometers distant from the repeater 200, the optical fiber of that length will act as a Raman amplifier.

The present invention enables the response signal to be surely sent back to the end station 100 even if a fiber fault occurs at a position close to the Raman amplification repeater 200 and ASE is not available, so that the reliability and quality of the monitor control and repeater control can be improved.

Figure 3:
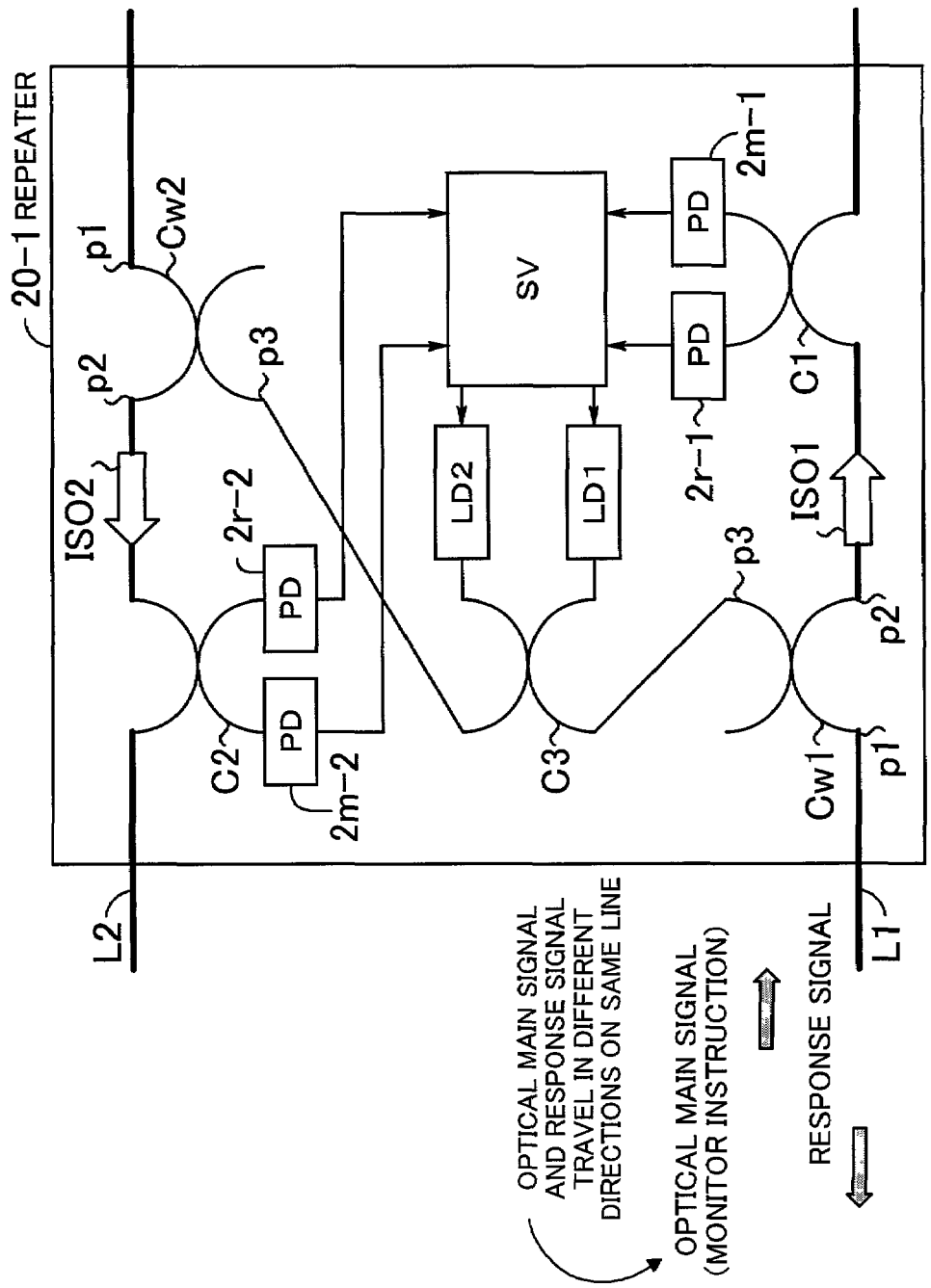
FIG. 3 is a block diagram of a repeater according to a first embodiment of the present invention.

Next, a description will be given of a structure of the repeater 20 according to a first embodiment of the present invention in which the response signal travels in the direction reverse to that in which the optical main signal travels on the same transmission line. FIG. 3 is a block diagram of a repeater 20-1 according to the first embodiment of the present invention.

Referring to FIG. 3, the repeater 20-1 includes laser diodes LD1 and LD2, a supervisory circuit SV, and a photocoupler C3. Each of the laser diodes LD1 and LD2 emits a pump light of 1.45 $\mu$m. The supervisory circuit SV includes the monitor control function and the regeneration control function. The photocoupler C3 has a branching ratio of 1:1.

The repeater 20-1 includes, in the up line L1, a WDM (Wavelength Division Multiplexing) coupler Cw1, an isolator ISO1, a photocoupler C1 with a branching ratio of 1:20, and photodiodes 2m-1 and 2r-1. The repeater 20-1 includes, in the down line L2, a WDM coupler Cw2, an isolator ISO2, a photocoupler C2 with a branching ratio of 1:20, and photodiodes 2m-2 and 2r-2.

The photocoupler C3 splits the pump lights from the laser diodes LD1 and LD2 into the up line L1 and the down line L2 with the branching ratio 1:1. The branching ratio 20:1 of the photocouplers C1 and C2 means that the signal that is input to the repeater 20-1 has an amount of 1 assuming that the signal traveling in the optical fiber cable has an amount of 20.

The WDM couplers Cw1 and Cw2 allow the light signal of 1.55 $\mu$m to pass from port p1 to port p2, and allows the pump light of 1.45 $\mu$m to pass from port p3 to port p1.

The photodiodes 2m-1 and 2m-2 include a band-pass filter (BPF) that allows only light in the 1.55 $\mu$m band to pass for receiving the monitor instruction. The photodiodes 2r-1 and 2r-2 include a band-pass filter that allows only light in the 1.45 $\mu$m band to pass for receiving the response signal.

Figure 4:
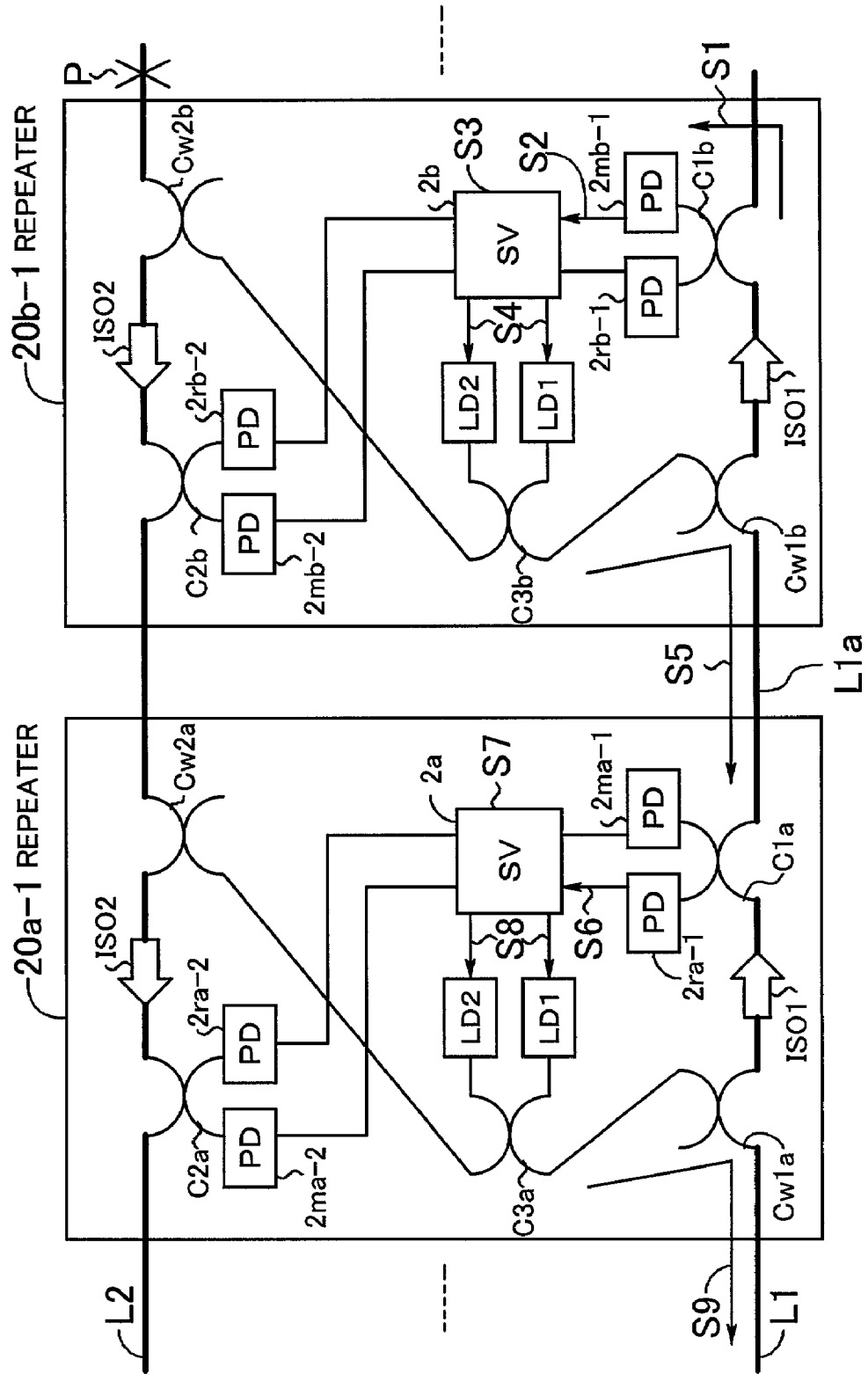
FIG. 4 is a diagram showing an operation of the repeater shown in FIG. 3 and a flow of signals therein.

The operation of the first embodiment of the present invention and the flow of signals are described below with reference to FIG. 4, which illustrates the operation and signal flow. FIG. 4 assumes that the end station 10 that is located on the left side of the drawing and is not illustrated for the sake of simplicity sends the monitor instruction in order to monitor the operating condition of a repeater 20b-1.

Step [S1]
The end station 10 sends the monitor instruction addressed to a repeater 20b-1 to the up line L1. The light signal (monitor instruction) of the wavelength 1.55 $\mu$m that travels in the up line L1 is split by a photocoupler C1b and is applied to the repeater 20b-1.

Step [S2]
A photodiode 2mb-1 receives the monitor instruction of 1.55 $\mu$m, and outputs a corresponding electric signal to the supervisory circuit (SV) 2b.

Step [S3]
The supervisory circuit 2b recognizes that the monitor instruction is addressed to its own repeater, and starts monitoring the operating condition thereof. Then, the supervisory circuit 2b creates response information. The supervisory circuit 2b ceases the regeneration control while processing the monitor instruction.

Step [S4]
The supervisory circuit 2b amplitude-modulates the pump lights for Raman amplification by response information. This is done by modulating the driving currents of the laser diodes LD1 and LD2.

Step [S5]
The pump lights of the wavelength 1.45 $\mu$m emitted by the laser diodes LD1 and LD2 pass through the photocoupler C3b and the WDM coupler Cw1b, and is incident to the up line L1a. This results in Raman amplification in which the up line L1a acts as an amplifying medium, and the response signal including the response information modulated onto the light signal that travels in the up line L1a is propagated to the repeater 20a-1.

Step [S6]
The photodiode 2ra-1 allows the response signal of 1.45 $\mu$m from the repeater 20b-1 to pass, and outputs its electric version to the supervisory circuit 2a.

Step [S7]
The supervisory circuit 2a shapes the waveform of the response signal to thus create the regenerated signal.

Step [S8]
The supervisory circuit 2a amplitude-modulates the pump lights for Raman amplification by the regenerated signal in such a manner that the circuit 2a modulates the driving currents that flow in the laser diodes LD1 and LD2.

Step [S9]
The pump lights of 1.45 $\mu$m respectively emitted by the laser diodes LD1 and LD2 pass through the photocoupler C3a and the WDM coupler Cw1a, and is incident to the up line L1 so that Raman amplification takes place. The above sequence is repeated so that the response signal is repeated by each upstream repeater toward the end station 10.

The above description mainly relates to the control by the end station located on the left side of the drawing. Similar control can be performed by the other end station located on the right side of the drawing.

Here, in the conventional art, the repeater that receives the monitor instruction from the up line L1 performs backward Raman amplification via the down line L2 and sends the response signal to the end station. Therefore, if a fiber fault occurs in the down line L2 very close to the repeater, this repeater cannot return the response signal.

In contrast, according to the first embodiment of the present invention, the repeater that receives the monitor instruction from the up line L1 performs backward Raman amplification via the up line L1. The response signal is repeated by each upstream repeater toward the end station 10. This structure is immune to a fiber fault (indicated by "X" in FIG. 4) that occurs in the down line L2 immediately close to the repeater 20. Therefore, the repeater 20 can return the response signal irrespective of whether light from the down line L2 is available. This improves the reliability of monitor control.

Figure 5:
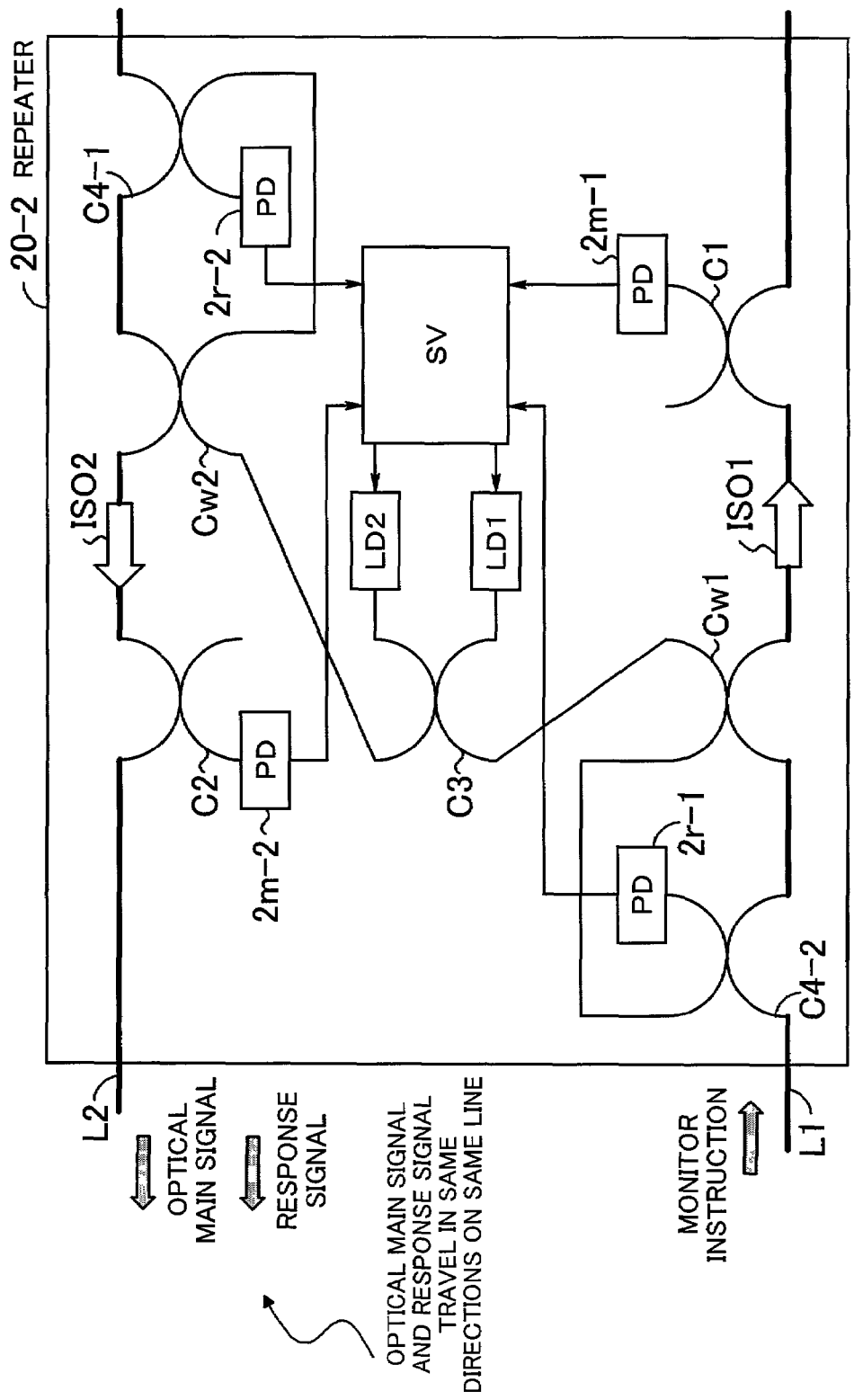
FIG. 5 is a block diagram of a repeater according to a second embodiment of the present invention.

A description will now be given of a second embodiment of the present invention in which the response signal travels in the same direction (forward direction) as that in which the main signal travels on the same line. FIG. 5 is a block diagram of a structure of the repeater according to the second embodiment of the present invention.

A repeater 20-2 includes photocouplers C4-1 and C4-2 with a branching ratio of 1:100 in addition to the repeater 20-1. The other structures of the repeater 20-2 are the same as corresponding those of the repeater 20-1. The branching ratio 100:1 of the photocouplers C4-1 and C4-2 means that the signal that is input to the repeater 20-2 has an amount of 1 assuming that the signal traveling in the optical fiber cable has an amount of 100.

Figure 6:
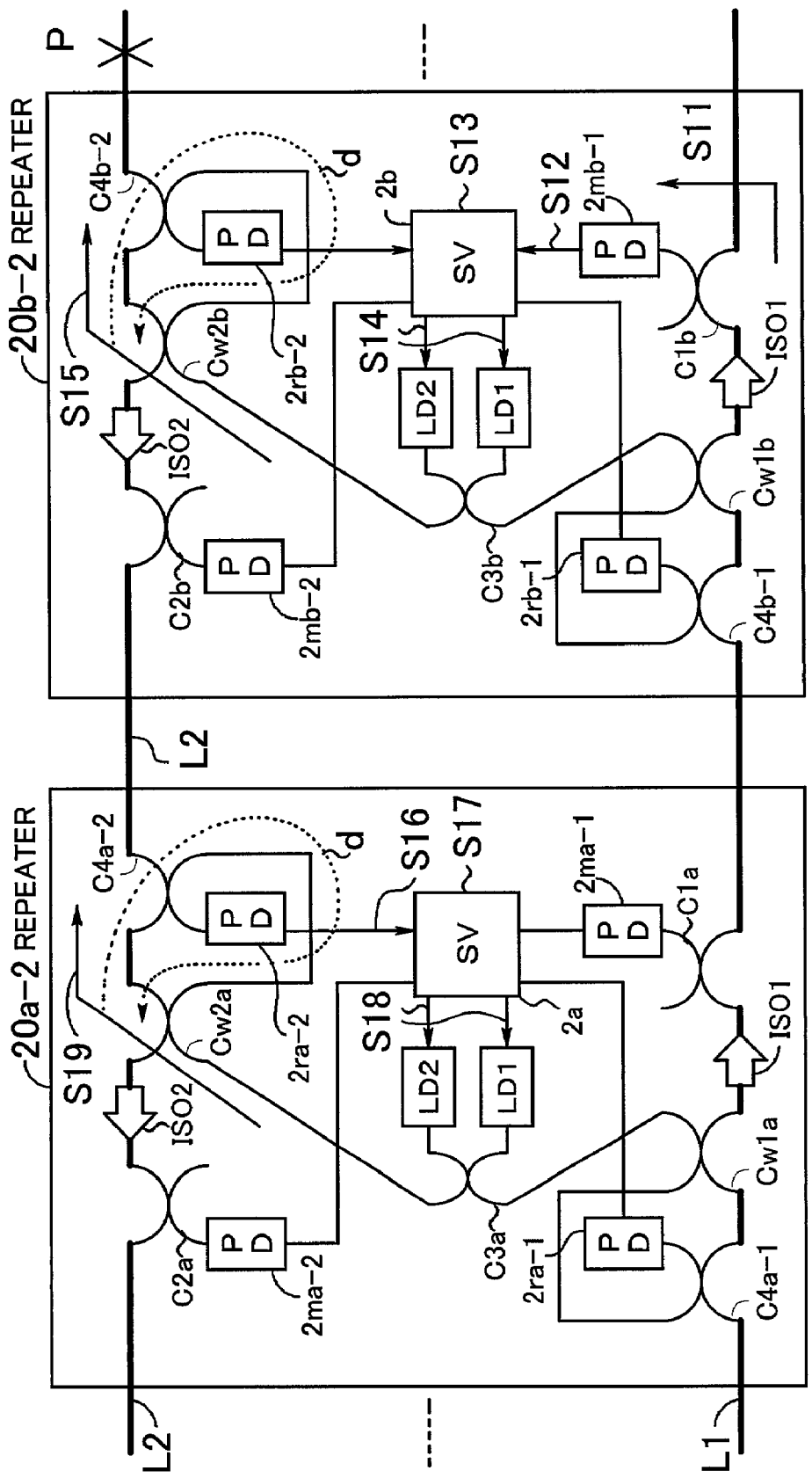
FIG. 6 is a diagram showing an operation of the repeater shown in FIG. 5 and a flow of signals therein.

The operation of the second embodiment of the invention and the flow of signals are described below. FIG. 6 is a diagram showing the operation and the signal flow. In FIG. 6, it is assumed that the end station 10 that is located on the left side of the drawing and is not illustrated for the sake of simplicity sends the monitor instruction in order to monitor the operating condition of a repeater 20b-2.

Step [S11]
The end station 10 sends the monitor instruction addressed to a repeater 20b-2 to the up line L1. The light signal (monitor instruction) of the wavelength 1.55 $\mu$m that travels in the up line L1 is split by the photocoupler C1b and is applied to the repeater 20b-2.

Step [S12]
The photodiode 2mb-1 receives the monitor instruction of 1.55 $\mu$m, and outputs a corresponding electric signal to the supervisory circuit (SV) 2b.

Step [S13]

The supervisory circuit 2b recognizes that the monitor instruction is addressed to its own repeater, and starts monitoring the operating condition thereof. Then, the supervisory circuit 2b creates response information that represents the result of monitoring the presence/absence of the signal light by the photodiode 2rb-2. The supervisory circuit 2b ceases the regeneration control while processing the monitor instruction.

Step [S14]

The supervisory circuit 2b amplitude-modulates the pump lights for Raman amplification by response information. This is done by modulating the driving currents of the laser diodes LD1 and LD2.

Step [S15]

The pump lights of the wavelength 1.45 μm emitted by the laser diodes LD1 and LD2 take a route indicated by a dotted line in the order of a WDM coupler Cw2b, photocoupler C4b-2, WDM coupler Cw2b, isolator ISO2, and photocoupler C2b, and is then incident to the down line L2. Thus, the pumping lights travel down the down line L2 together with the main signal in the same direction. At that time, response information is modulated onto the exciting light d passing through the WDM coupler Cw2b and the photocoupler C4a-2, so that the response signal is created and propagated to the repeater 20a-2.

A sufficient excitation power is emitted in the direction reverse to that of the signal light. However, there is a need to forwardly (leftwards in the drawing) transfer an appropriate amount of pump light d that may not cause forward Raman amplification and may be received by the repeater 20a-2. This determines the branching ratio 100:1 of the photocoupler C4b-2.

Step [S16]

The photodiode 2ra-2 allows the response signal of 1.45 μm from the repeater 20b-2 to pass, and outputs its electric version to the supervisory circuit 2a.

Step [S17]

The supervisory circuit 2a shapes the waveform of the response signal to thus create the regenerated signal.

Step [S18]

The supervisory circuit 2a amplitude-modulates the pump lights for Raman amplification by the regenerated signal in such a manner that the circuit 2a modulates the driving currents that flow in the laser diodes LD1 and LD2.

Step [S19]

The pump lights of 1.45 μm respectively emitted by the laser diodes LD1 and LD2 pass through the photocoupler C3a and the WDM coupler Cw2a, and is incident to the down line L2 so that backward Raman amplification takes place with respect to the signal light. The pump light d sends the response signal in the order of the WDM coupler Cw2a, photocoupler C4a-2, WDM coupler Cw2a, isolator ISO2 and the photocoupler C2a. The above sequence is repeated so that the response signal is repeated by each upstream repeater toward the end station 10.

As described above, according to the second embodiment of the present invention, in the repeater 20 that receives the monitor instruction from the up line L1, the pump light incident to the down line L2 is propagated by the WDM couplers Cw and the photocouplers C4 in the direction reverse to the pumping direction of the backward Raman amplification. The result of monitoring that is superimposed onto the pump light by the Raman amplification is generated and repeated via each repeater toward the end station 10.

The above structure is immune to a fiber fault (indicated by "X" in FIG. 6) that occurs in the down line L2 immediately close to the repeater 20. Therefore, the repeater 20 can return the response signal irrespective of whether light from the down line L2 is available. This improves the reliability of monitor control.

As described above, according to the optical transmission system of the present invention, in the repeater with optical amplification using the optical fiber transmission medium as an amplifying medium, response information that is the result of monitoring its own operating condition is created responsive to the monitor instruction sent by the end station. Further, the regenerated signal is created by regeneration control of the response signal. The pump light is modulated by the response information or the regenerated signal to create the response signal, which is repeated. Thus, the monitor control is available without superimposing the result of monitoring onto the optical main signal even if a fiber fault occurs at a position very close to the repeater. This improves the reliability and quality of the optical communication control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system comprising:
   an end station including a monitor instruction sending unit for sending a monitor instruction for monitoring an operating condition of a repeater, and an operating condition recognizing unit for receiving a response signal from the repeater and recognizing the operating condition; and
   a repeater including:
   a filtering unit filtering the monitor instruction and the response signal;
   a monitor control unit monitoring the operating condition of the repeater in response to the monitor instruction and generating response information that is a result of monitoring;
   a pump unit applying a pump light to an optical fiber transmission medium and enabling an optical amplification using the optical fiber transmission medium as an amplifying medium;
   a regeneration control unit performing a regeneration control of the response signal sent by another repeater to thereby generate a regenerated signal;
   a modulation control unit modulating the pump light by the response information or the regenerated signal to generate the response signal, and modulating another pump light by the response information or the regenerated signal to generate the response signal, said another pump light being in the direction reverse to a pumping direction, so as not to cause forward Raman amplification and to be receivable by an adjoining repeater, when the response signal travels in a direction identical to that in which an optical main signal travels; and
   a photocoupler unit that is connected to the optical fiber transmission medium and sends the response signal in a direction identical to or reverse to that in which the optical main signal travels.

2. The optical transmission system according to claim 1, wherein the pump unit performs backward Raman amplification.

3. The optical transmission system according to claim 1, wherein the regeneration control unit ceases the regeneration control when the modulation control of the pump light is based on the response information.

4. A repeater for an optical transmission comprising:
 a filtering unit filtering a monitor instruction for monitoring an operating condition of the repeater and a response signal;
 a monitor control unit monitoring the operating condition of the repeater in response to the monitor instruction and generating response information that is a result of monitoring;
 a pump unit applying a pump light to an optical fiber transmission medium and enabling an optical amplification using the optical fiber transmission medium as an amplifying medium;
 a regeneration control unit performing a regeneration control of the response signal sent by another repeater to thereby generate a regenerated signal;
 a modulation control unit modulating the pump light by the response information or the regenerated signal to generate the response signal, and modulating another pump light by the response information or the regenerated signal to generate the response signal, said another pump light being in a direction reverse to a pumping direction, so as not to cause forward Raman amplification to be receivable by an adjoining repeater, when the response signal travels in a direction identical to that in which an optical main signal travels; and
 a photocoupler unit that is connected to the optical fiber transmission medium and sends the response signal in a direction identical to or reverse to that in which the optical main signal travels.

5. The repeater according to claim 4, wherein the pump unit performs backward Raman amplification.

6. The repeater according to claim 4, wherein the regeneration control unit ceases the regeneration control when the modulation control of the pump light is based on the response information.

* * * * *